(12) United States Patent
Hampiholi et al.

(10) Patent No.: US 10,284,651 B2
(45) Date of Patent: May 7, 2019

(54) DATA AGGREGATION AND DELIVERY

(71) Applicant: Harman International Industries, Incorporated, Stamford, CT (US)

(72) Inventors: Vallabha Vasant Hampiholi, Bangalore (IN); Girisha Ganapathy, Bangalore (IN); Suhas Rao, Sagara (IN); Sharath Chandrashekar, Bangalore (IN); Sujay Kulkarni, Bagalkot (IN)

(73) Assignee: Harman International Industries, Incorporated, Stamford, CT (US)

( * ) Notice: Subject to any disclaimer, the term of this patent is extended or adjusted under 35 U.S.C. 154(b) by 237 days.

(21) Appl. No.: 14/192,748

(22) Filed: Feb. 27, 2014

(65) Prior Publication Data

US 2015/0244805 A1    Aug. 27, 2015

(51) Int. Cl.
*H04L 29/08* (2006.01)
*H04W 4/44* (2018.01)
(Continued)

(52) U.S. Cl.
CPC ........ *H04L 67/12* (2013.01); *G06F 17/30867* (2013.01); *H04L 67/10* (2013.01);
(Continued)

(58) Field of Classification Search
CPC ... H04L 67/12; H04L 67/10; G06F 17/30867; G06F 17/30876; H04W 4/046;
(Continued)

(56) References Cited

U.S. PATENT DOCUMENTS

| 6,587,755 B1 | 7/2003 | Smith et al. |
| 2004/0187158 A1* | 9/2004 | Fellenstein ........ H04N 7/17318 725/86 |

(Continued)

FOREIGN PATENT DOCUMENTS

WO    2014014501 A1    1/2014

OTHER PUBLICATIONS

Ray Wert, BMW Assist, Google Maps Introduce "MyInfo" Service, Apr. 12, 2008, www.jalopnik.com, https://jalopnik.com/379103/bmw-assist-google-maps-introduce-myinfo-service-for-new-big-ass-x6.*

(Continued)

*Primary Examiner* — David R Lazaro
*Assistant Examiner* — Zi Ye
(74) *Attorney, Agent, or Firm* — McCoy Russell LLP

(57) ABSTRACT

Embodiments are disclosed for systems and methods for controlling data aggregation and delivery between multiple user devices. In some embodiments, an in-vehicle computing system comprises a processor, an external device interface communicatively coupleable to an extra-vehicle server, and a storage device storing instructions executable by the processor. The instructions may be executable to send user information to the extra-vehicle server, the user information including information identifying a primary user of the in-vehicle computing system, receive targeted information from the server, the targeted information based on contextual information determined from interaction of the primary user with another device, and present the targeted information.

20 Claims, 9 Drawing Sheets

(51) Int. Cl.
*G06F 17/30* (2006.01)
*H04W 4/21* (2018.01)
*H04W 4/04* (2009.01)

(52) U.S. Cl.
CPC ............. *H04W 4/046* (2013.01); *H04W 4/21* (2018.02); *H04W 4/44* (2018.02)

(58) Field of Classification Search
CPC ........ H04W 4/206; H04W 4/44; G01C 21/36; G01C 21/362; G01C 21/3484
USPC ............... 709/217; 705/14.62; 701/533, 410; 707/796
See application file for complete search history.

(56) References Cited

U.S. PATENT DOCUMENTS

| | | | | |
|---|---|---|---|---|
| 2008/0077317 A1* | 3/2008 | Zabel | ................... | G01C 21/362 701/410 |
| 2008/0195306 A1* | 8/2008 | Moinzadeh | .......... | G01C 21/362 701/420 |
| 2012/0047529 A1* | 2/2012 | Schultz | ................ | H04N 21/252 725/34 |
| 2013/0151149 A1* | 6/2013 | Kristinsson | .......... | G01C 21/362 701/533 |
| 2013/0152215 A1* | 6/2013 | Khosravy | .............. | G06Q 50/10 726/28 |
| 2014/0201004 A1* | 7/2014 | Parundekar | ........ | G06Q 30/0265 705/14.62 |
| 2014/0280355 A1* | 9/2014 | Gerdes | ............... | G01C 21/3484 707/796 |
| 2014/0365125 A1* | 12/2014 | Vulcano | ................. | G01C 21/36 701/533 |
| 2015/0100454 A1* | 4/2015 | Cook | ................. | G06Q 30/0631 705/26.7 |
| 2016/0212229 A1* | 7/2016 | McGavran | ........... | G06N 99/005 |

OTHER PUBLICATIONS

Joann Muller, Google's Map Features Find Their Way Into More Cars, Sep. 4, 2013, Forbes, https://www.forbes.com/sites/joannmuller/2013/09/04/googles-map-features-find-their-way-into-more-cars/.*
European Patent Office, Partial European Search Report Issued in Application No. 15156454.9, dated Jul. 21, 2015, Germany, 5 pages.
European Patent Office, Extended European Search Report Issued in Application No. 15156454.9, dated Nov. 6, 2015, Germany, 11 pages.

* cited by examiner

DATA AGGREGATION AND DELIVERY

FIELD

The disclosure relates to aggregating data from multiple sources and delivering data to user devices.

BACKGROUND

Users may own and/or interact with multiple devices providing user experiences while performing everyday tasks, leisurely activities, job duties, and other activities. While each device may be connected to a network, the differences between the devices (e.g., manufacturer, user interface, device capabilities, etc.) may result in disparate user experiences as the user transitions from one device to another. For example, a user may use one device to consume media, another to discover information related to the consumed media, and yet another device to navigate to a location related to the discovered information. As the user transitions between devices, the user may manually enter information gleaned from one device into another device in order to take advantage of the particular features of that other device.

SUMMARY

Embodiments are disclosed for systems and methods for controlling data aggregation and delivery between multiple user devices. In some embodiments, an in-vehicle computing system comprises a processor, an external device interface communicatively coupleable to an extra-vehicle server, and a storage device storing instructions executable by the processor. The instructions may be executable to send user information to the extra-vehicle server, the user information including information identifying a primary user of the in-vehicle computing system, receive targeted information from the server, the targeted information based on contextual information determined from interaction of the primary user with another device, and present the targeted information.

In some embodiments, a system for delivering targeted data to user devices may comprise a data integration subsystem that receives data from an in-vehicle computing system and at least one other user device, and an analytics engine that analyzes the received data. The system may further comprise a data delivery engine that generates and sends targeted information to the in-vehicle computing system based on results from the analytics engine responsive to detecting that a user of the at least one other user device is interacting with the in-vehicle computing system.

In some embodiments, a method for delivering targeted information to one or more devices may comprise receiving user information, the user information including information identifying a primary user of an in-vehicle computing system, and aggregating the user information with information from one or more other devices associated with the primary user to determine contextual information for the primary user. The method may further comprise generating targeted information based on the contextual information and sending the targeted information to a selected device of the one or more other devices.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a user may transition between different devices while performing tasks related to a context of the user. For example, a user may own and/or interact with a television or other home entertainment device, a mobile phone (e.g., a smart phone), and an in-vehicle computing system (e.g., a head unit for an infotainment system in a vehicle). By aggregating information from each of these devices, as well as historical data for the users/devices, a context of the user may be constructed in order to determine targeted information that may provide a smooth transition between the user experiences provided by the different devices.

Figure 1:
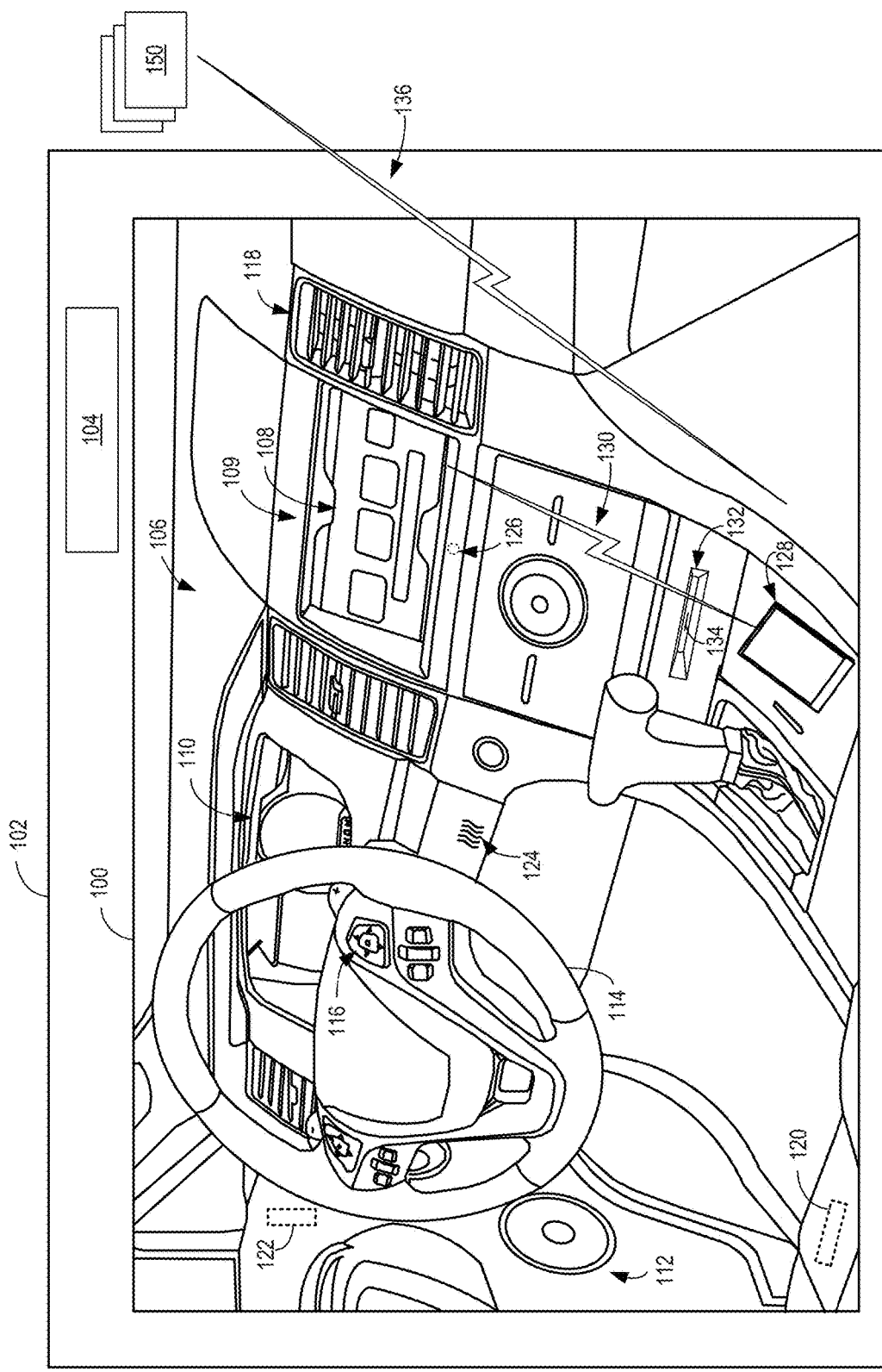
FIG. 1 shows an example partial view of an interior of a cabin of a vehicle in accordance with one or more embodiments of the present disclosure.

While a user may change environments while transitioning between devices (e.g., traveling from a home environment with a home entertainment device to a vehicle with an in-vehicle computing system), a user may additionally or alternatively transition between devices while staying in the same environment (e.g., using an in-vehicle computing system and a mobile phone while in a vehicle). FIG. 1 shows an example partial view of one type of environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Vehicle 102 may be a road automobile, among other types of vehicles.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
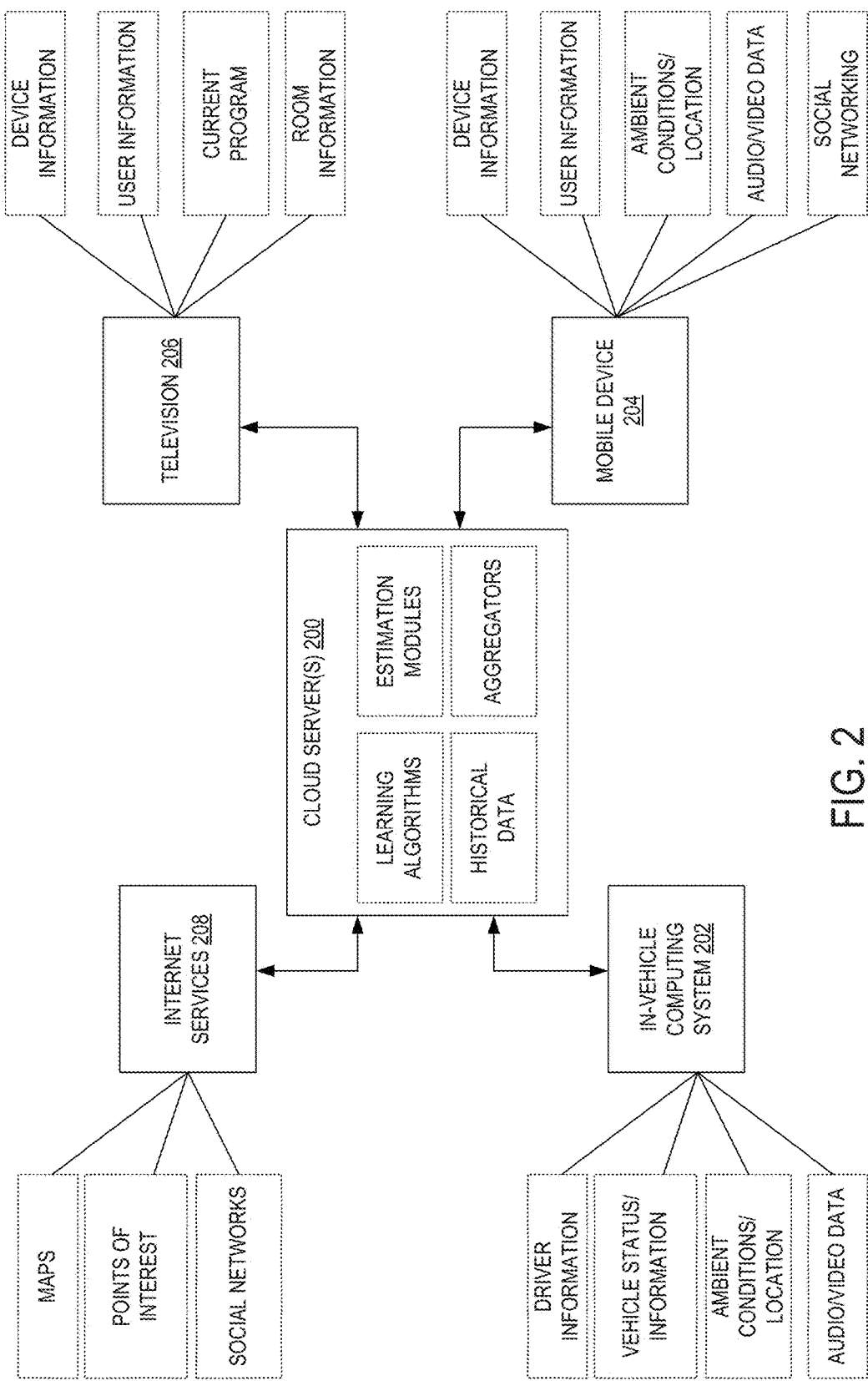
FIG. 2 shows a plurality of information sources for a cloud-based server in accordance with one or more embodiments of the present disclosure.

FIG. 2 shows a plurality of devices and information that may be transferred between the devices and a cloud-based server (or collection of servers) 200. For example, an in-vehicle computing system 202, which may correspond to in-vehicle computing system 109 of FIG. 1, may receive and/or determine/generate information including but not limited to driver information, vehicle status/information (e.g., make/model/year, service history, average gas mileage, current operating conditions, etc.), ambient conditions/location/navigation information, audio/video data (e.g., media being consumed by a user and/or recorded by the in-vehicle computing system 202), and/or any other suitable information. This driver/vehicle-related information may be provided to the cloud-based server(s) 200 to provide a context of the user with regards to the user's driving styles/preferences, frequented routes/points of interest, etc. The information provided to the cloud-based server(s) 200 from the in-vehicle computing system 202 may be sensed by the in-vehicle computing system 202 and/or elements communicatively connected to the in-vehicle computing system 202 in some embodiments. The information may additionally or alternatively be provided to the in-vehicle computing system 202 via another device and/or read from one or more storage devices that are local to and/or remote from the in-vehicle computing system 202.

Information may be received and/or determined/generated by other devices, such as mobile device 204 and television 206 to be transmitted to the cloud-based server(s) 200. For example, the mobile device 204 may provide device information (e.g., device make/model, identifier, usage information, etc.), user information (e.g., user identifier, demographic information for the user, user preferences, user context, etc.), ambient conditions/locations/navigational information, audio/video data (e.g., recorded and/or consumed, as described above), social networking information (e.g., user profiles associated with the device and/or user), etc. Likewise, the television 206 may provide device information, user information, information regarding a currently viewed program (e.g., program identifier, channel, program genre/content, amount of time program has been viewed, etc.), room information (e.g., room layout, presence of other users in the room, etc.), and/or any other suitable information relating to the context of a user interacting with the television 206. It is to be understood that the term television, as used herein, may refer to any suitable portion of a home entertainment system in communication with a television, such as the television/display device, an audio/video receiver, a set-top box, etc.

The cloud-based server(s) 200 may receive information from internet services 208, such as map information (e.g., routes, traffic information, public transit information, etc.), points of interest (e.g., addresses, contact information, reviews, etc.), social networks (e.g., user profiles and/or user content related to users and/or contacts of users of the devices 202, 204, and/or 206), and/or any other suitable information from one or more internet-based services. It is to be understood that the information (and devices) described above and illustrated in FIG. 2 is exemplary in nature, and additional or alternative information may be provided to the cloud-based server(s) 200 from any number and type of devices. As a non-limiting example, information illustrated as being provided by the mobile device 204 (e.g., social networking information) may additionally or alternatively be provided by in-vehicle computing system 202. The amount and type of information provided by a given device may be determined based upon the information available to that device and/or the speed, quality, and/or security of the communication link between that device and the cloud-based server(s) 200. For example, user-specific information may only be transmitted if the user provides approval and/or if the information is encrypted and able to be sent over a communication link having a particular level of security.

The cloud-based server(s) 200 may include one or more modules for receiving, processing, and outputting data to and/or from the devices and services connected to the server(s). For example, the cloud-based server(s) 200 may include aggregators for collecting data from the multiple sources (e.g., from devices 202, 204, and 206, and from services 208) and combining/organizing the received data for use by other modules. Aggregated data and/or outputs from other modules may be stored in local and/or remote storage and accessed by a historical data module when performing processing that utilizes historical data. For example, a learning algorithm may combine historical data with currently-received data in order to determine behaviors and/or relationships between data. Learning algorithms may be utilized to learn user behaviors/preferences during different contexts in order to provide recommendations and/or predict information that may be useful to a user in a given context. The learning algorithms may utilize information from multiple devices/users and/or information specific to a particular device/user in order to provide intelligent responses to data requests and/or other events. For example, learning algorithms may be utilized to determine a particular user based upon patterns of device usage, provide recommendations (e.g., for products/services/points of interest/routing, etc.) based on past user selections/activities, interpret incoming data, and/or perform any other suitable data processing. Estimation modules may utilize aggregated information from the different devices/services, as well as input from historical data and/or learning algorithms, in order to determine estimations of non-discrete data, such as user lifestyles (e.g., financial status, behaviors, routines, device usage characteristics, preferences, etc.), which may not be directly provided to the system.

Outputs of the modules may be provided to one or more of the devices connected to the cloud-based server(s) 200.

For example, the cloud-based server(s) may receive information from the television 206 identifying a currently-viewed program (e.g., a cooking program depicting preparation of a type of food may be identified based on information received from a set-top box, information in a channel listing retrieved from the Internet, and/or other suitable information sources) and determine that the user may be interested in receiving a product/service associated with the currently-viewed program (e.g., order take out service from a restaurant serving a similar type of food) based on an estimation of user preferences/behaviors responsive to watching such a program. The cloud-based server(s) 200 may request/receive information from the internet services 208 including contact information for a nearby point of interest (e.g., the restaurant) and send the contact information to the mobile device 204 (e.g., to enable the user to contact the restaurant and order the take out service). Further examples of modules within a cloud-based server are described in more detail below with respect to FIG. 6 and examples of data aggregation and delivery are described in more detail with respect to FIGS. 4, 5, and 7.

Figure 3:
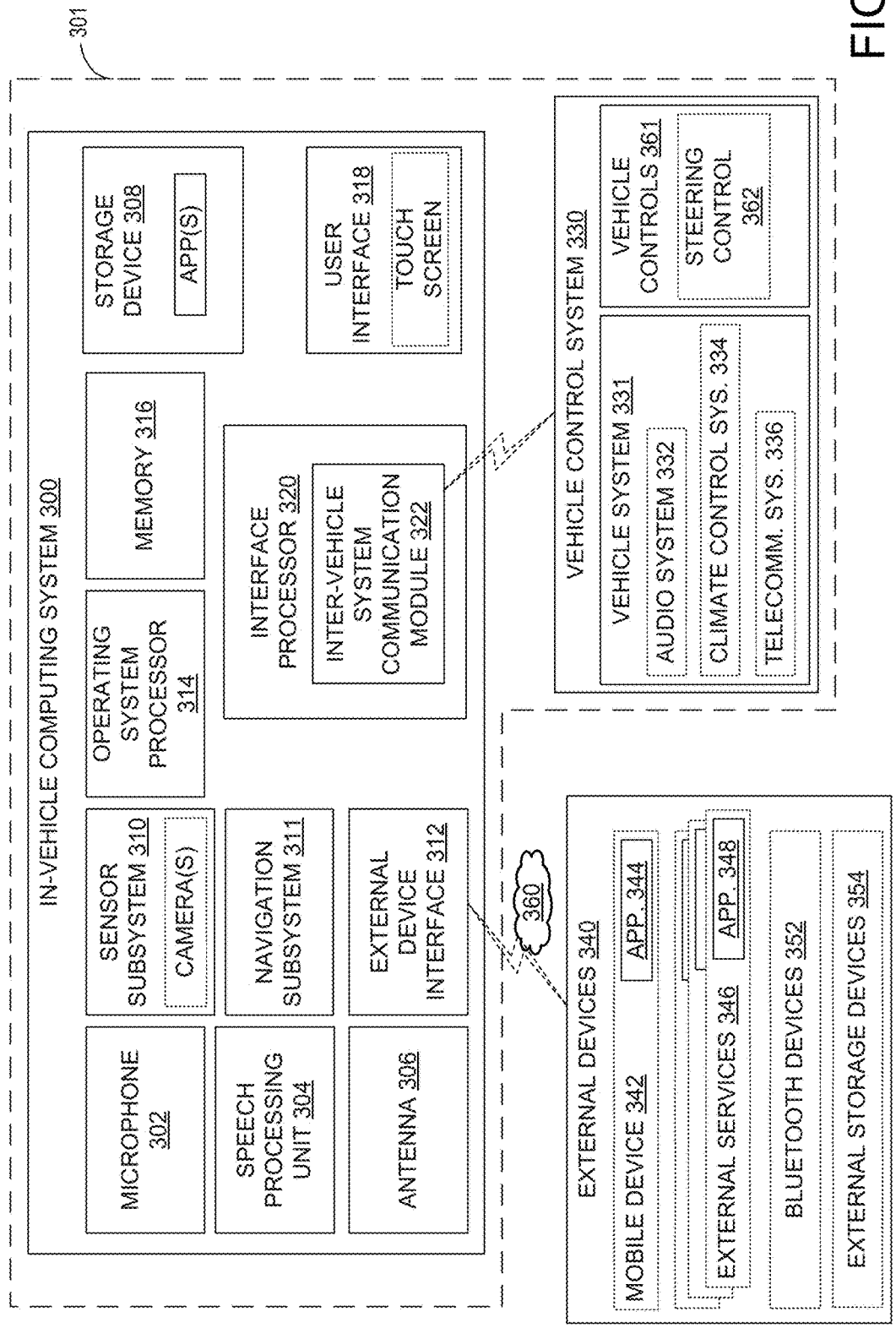
FIG. 3 shows a block diagram of an in-vehicle computing system in accordance with one or more embodiments of the present disclosure.

As described above with respect to FIG. 2, data may be acquired and/or determined/generated by devices in any suitable manner. For example, in-vehicle computing systems may glean contextual data for a user from multiple vehicle system sources, as well as direct user input. FIG. 3 shows a block diagram of an in-vehicle computing system 300 configured and/or integrated inside vehicle 301. In-vehicle computing system 300 may be an example of in-vehicle computing system 109 of FIG. 1 and/or in-vehicle computing system 202 of FIG. 2 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to a cloud-based server and/or collecting information for transmission to the cloud-based server. The application may retrieve information gathered by vehicle systems/sensors, input devices (e.g., user interface 318), devices in communication with the in-vehicle computing system (e.g., a mobile device connected via a Bluetooth link), etc. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands from a user, to measure ambient noise in the vehicle, to determine whether audio from speakers of the vehicle is tuned in accordance with an acoustic environment of the vehicle, etc. A speech processing unit 304 may process voice commands, such as the voice commands received from the microphone 302. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle and/or a cabin camera for identifying a user (e.g., using facial recognition and/or user gestures). Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346, such as cloud-based service(s) 200 of FIG. 2. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver.

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages, as well as navigational assistance, may be displayed to the user on a display of the user interface. As elaborated below with respect to FIGS. 5 and 7, user preferences/information and/or selection of targeted information may be performed via user input to the user interface.

Figure 4:
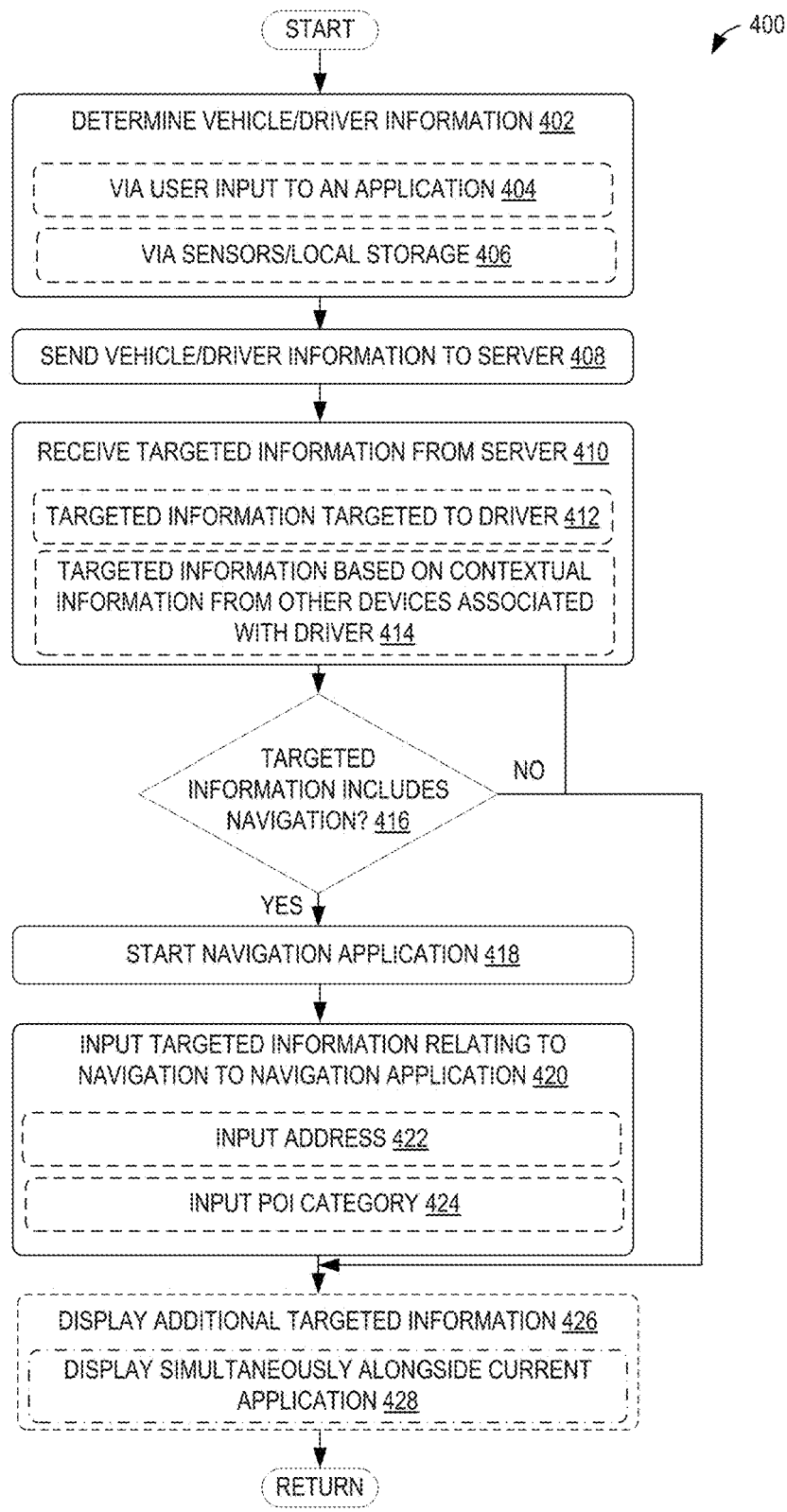
FIG. 4 is a flow chart of a method for presenting targeted information via an in-vehicle computing system in accordance with one or more embodiments of the present disclosure.

FIG. 4 is a flow chart of a method 400 for presenting targeted information via an in-vehicle computing system, such as in-vehicle computing system 109 of FIG. 1. At 402, the method 400 includes determining vehicle/driver information. For example, vehicle/driver information may be determined via user input to an application of the in-vehicle computing system, as indicated at 404. The application may provide a form and/or a collection of drop-down menus, selectable buttons, and/or other user interface elements for capturing/requesting user information input by the user. For example, the application may provide regions to specify a user name, demographic information (e.g., age, date of birth, marital/family status, place of residence, etc.), user preferences for interacting with the system (e.g., information that may be collected and ways in which such collection may be performed, information that may be displayed, approved connections/synchronizations with user accounts, appearance of displayed information, etc.), lifestyle preferences (e.g., food preferences/restrictions, music/film/book/sport preferences, favorite activities, etc.), and/or any other suitable user information. The application may provide additional regions for specifying information particular to the device and/or vehicle, such as vehicle make/model/year, fuel type, capacity, service history, travel preferences (e.g., preferred destinations, routes, etc.), device identifier, etc.

Additionally or alternatively, information may be determined via sensors and/or local storage devices in communication with the in-vehicle computing system, as indicated at 406. In this way, the determining may be performed by receiving and/or generating information at the in-vehicle computing system. At 408, the method 400 includes sending the vehicle/driver information to a server, such as cloud-based server(s) 200 of FIG. 2.

At 410, the method 400 includes receiving targeted information from the server. For example, the targeted information may be targeted to a driver of the vehicle identified by the driver information, as indicated at 412. The targeted information may additionally or alternatively be based on contextual information from other devices associated with the driver, as indicated at 414. For example, the targeted information may be provided to the in-vehicle computing system in order to continue and/or relate to a user experience provided by another device and/or a user activity detected by another device. In this way, the targeted information may be received at the in-vehicle computing system automatically without user input directed to the in-vehicle computing system and/or without user input requesting the targeted information to be sent to the in-vehicle computing system. Accordingly, the targeted information may be sent to the in-vehicle computing system responsive to user input at a different device or responsive to a determination of a contextual trigger at a cloud-based server. An example of a contextual trigger may be a determination that a notification is to be presented at a device with which the user is not currently interacting.

At 416, the method 400 includes determining if the targeted information includes navigation data. For example, if the user activity detected by the other device includes or is related to traveling to a point of interest, navigation information to that point of interest may be included in the targeted information. If the targeted information includes navigation data (e.g., "YES" at 416), the method 400 proceeds to 418 to start a navigation application. At 420, the method 400 includes inputting the targeted information related to the navigation data to the navigation application. For example, inputting the targeted information may include inputting an address/route identification to the navigation application to start navigating to the address, as indicated at 422. Inputting the targeted information may include inputting a point of interest category, as indicated at 424. For example, if the navigational information includes an identification of a possible type of location to which the user may be traveling without identifying a particular point of interest, a point of interest category related to the type of location (e.g., a restaurant, an airport, a museum, etc.) may be input into the navigational application in order to generate a list of possible destinations selectable by the driver.

If the targeted information does not include navigational data (e.g., "NO" at 416) or if the targeted information includes other information in addition to navigational data, the method 400 may proceed to 426 to display additional targeted information (e.g., via a display of the in-vehicle computing system). In some embodiments, the targeted information may be displayed simultaneously alongside a current application, as indicated at 428. For example, if the current application (e.g., an application that has system-wide focus) is a navigational application and the additional targeted information includes advertisements for products related to a television program viewed earlier, the advertisements may be displayed on one portion of the display, while the navigational application (e.g., a map, a list of directions, etc.) may be displayed on another portion of the display. The location of targeted information during simultaneous display may be adjusted and/or selected by a user (e.g., via user preferences specified in an application of the in-vehicle computing system controlling the receipt of targeted information).

It is to be understood that the targeted information and/or additional targeted information may additionally or alternatively be provided to one or more third party data service providers (e.g., upon receiving approval from the user to send the information to the providers). In some embodiments, responsive to determining that targeted information is ready to be displayed to the user/sent to the third party provider(s), one or more prompts (e.g., audible prompts, visual prompts, etc.) may be presented to a user to enable the user to indicate interest in the targeted information (e.g., by providing voice input, gesture input, touch input, etc.). Additionally, prompts may be utilized to determine whether the user permits and/or is interested in the collection of data described above.

Figure 5:
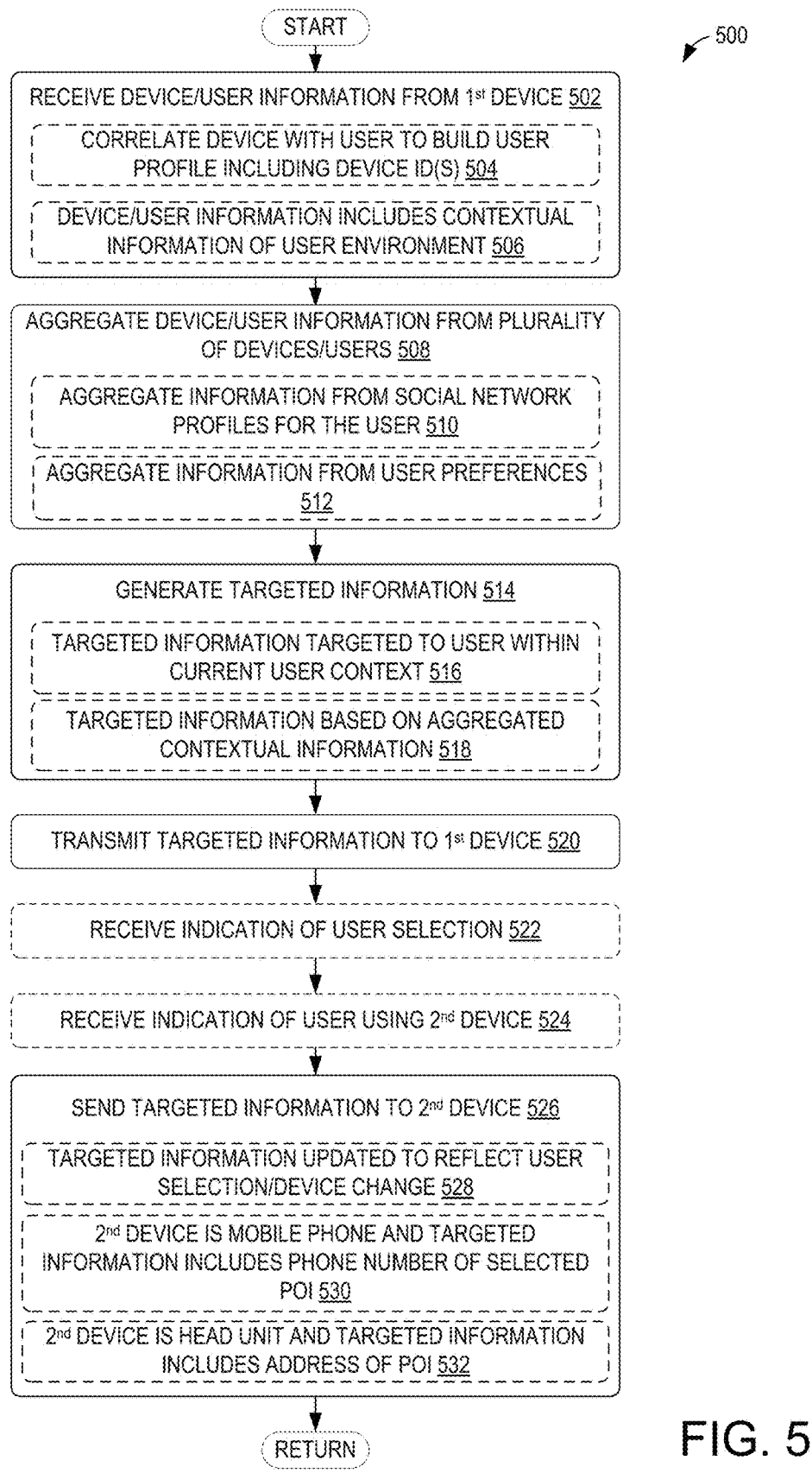
FIG. 5 is a flow chart of a method for providing targeted information via a cloud-based server in accordance with one or more embodiments of the present disclosure.

FIG. 5 is a flow chart of a method 500 for aggregating data and delivering targeted information with a server, such as the cloud-based server(s) 200 of FIG. 2. At 502, the method 500 includes receiving device/user information from a first device. For example, the device/user information may be received from an in-vehicle computing system, a television, a mobile device, and/or any other suitable device. As indicated at 504, the device from which the information is received may be correlated and/or associated with an identified user of the device in order to build/modify a user profile including device identifiers for devices that are utilized by the user. The device/user information may include contextual information of a user environment, as indicated at 506. For example, audio/video data collected by the device may indicate a current location, activity, and/or state of a user.

At 508, the method 500 includes aggregating device/user information from a plurality of devices/users. For example, information from one or more social network profiles for the user may be aggregated, as indicated at 510. Information from user-specified preferences may be aggregated, as indicated at 512. Aggregated information from multiple devices of a user may provide contextual clues regarding the state of the user and/or behaviors of the user, while aggregated information from multiple users of a device may provide contextual clues regarding typical uses of a particular device.

At 514, the method 500 includes generating targeted information. The targeted information may be targeted to the user within a current user context, as indicated at 516. For example, the device/user information from the first device may indicate a current activity of the user, and the targeted information may be related to the current activity. The targeted information may additionally or alternatively be based on aggregated contextual information, as indicated at 518. For example, a current context of the user may be derived from device/user information collected over time and/or for a plurality of users/devices, and targeted information related to the derived context may be generated by the server.

The method 500 includes transmitting the targeted information to the first device, as indicated at 520. At 522, the server may receive an indication of user selection based on the targeted information. For example, the targeted information may include a list of recommended restaurants, and the server may receive an indication that the user selected a particular restaurant in the list. Additionally or alternatively, the server may receive an indication that the user is using a second, different device, as indicated at 524. For example, the user may begin providing input to the second device, indicating that the user has either switched from the first to the second device or is using both devices simultaneously.

At 526, the method 500 includes sending targeted information to the second device. In some embodiments, the same targeted information that is sent to the first device may be sent to the second device. In additional or alternative embodiments, the targeted information may be updated to reflect user selection and/or a device change, as indicated at 528. For example, based on the user selection and/or the type of device being used by the user, additional information may be requested (e.g., from other devices, historical data, internet services, etc.) and/or different/additional data may be aggregated and processed in order to determine targeted information reflecting the change of context of the user. In embodiments where the second device is a mobile phone, the targeted information may include contact information, such as a phone number of a selected point of interest (e.g., selected from the targeted information sent to the first device), as indicated at 530. In embodiments where the second device is a head unit (e.g., of an in-vehicle computing system), the targeted information may include an address of a selected point of interest. It is to be understood that the server may continuously receive information from devices that are used by the user and dynamically or periodically update targeted information provided to one or more of the devices based on a changing context of the user.

Figure 6:
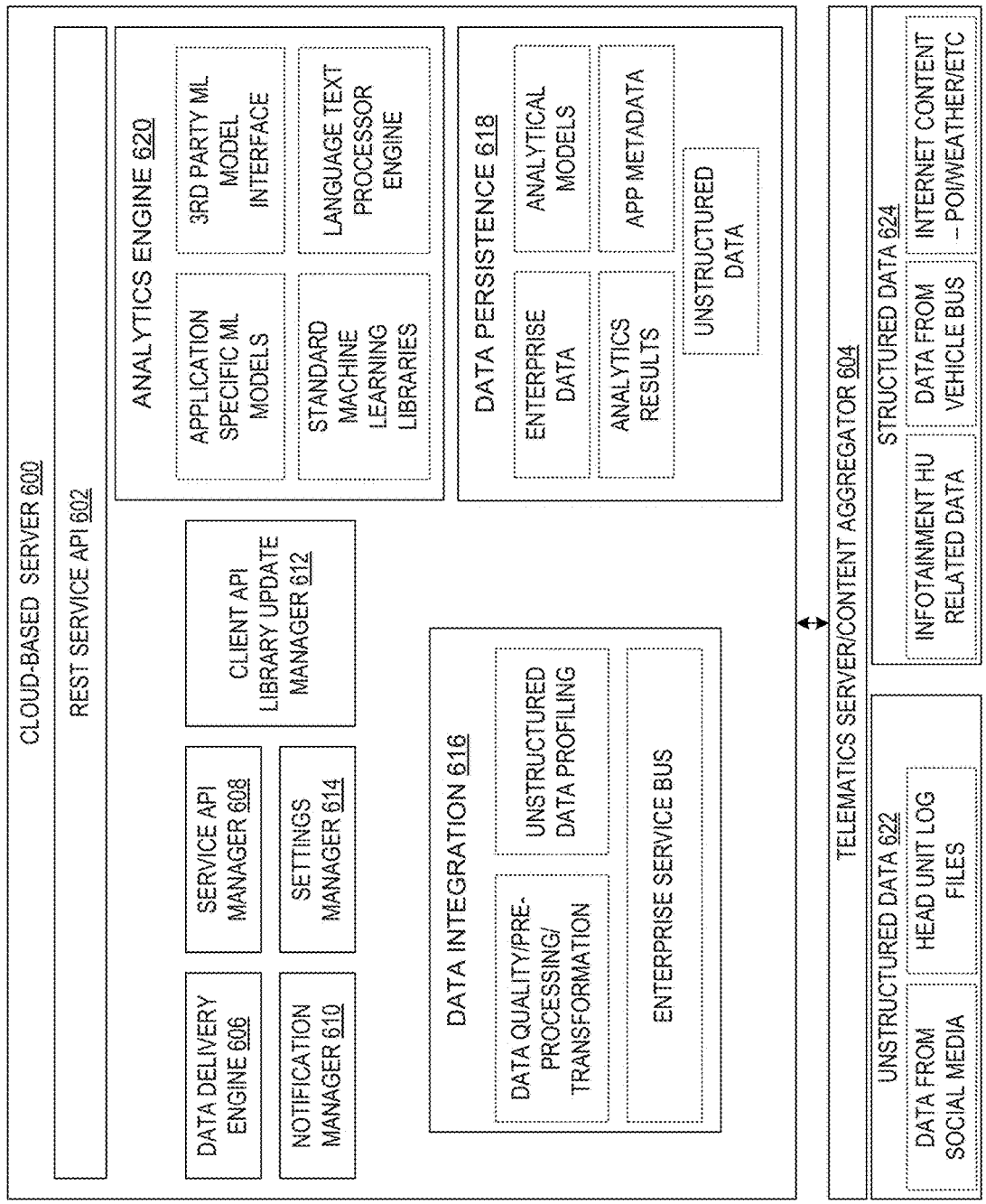
FIG. 6 shows a block diagram of a cloud-based server in accordance with one or more embodiments of the present disclosure.

FIG. 6 shows a block diagram of a cloud-based server 600 for providing context-specific targeted information to devices, including an in-vehicle computing system (e.g., in-vehicle computing system 109 of FIG. 1) in accordance with one or more embodiments of the disclosure. For example, cloud-based server 600 may be an example of cloud-based server(s) 200 of FIG. 2 and may be utilized to perform method 500 of FIG. 5. It is to be understood that the components illustrated in FIG. 6 are neither limiting nor exhaustive, as the cloud-based server 600 may include fewer, additional, and/or alternative components to those illustrated. The cloud-based server 600 may include an API, such as a REST service API 602, to define the roles and interactions of the components of the cloud-based server and provide an accessible interface to allow the components to be accessed by clients of the server (e.g., external devices communicatively connected to the server, such as other servers, mobile devices, televisions, in-vehicle computing systems, etc.).

The cloud-based server 600 may include a data delivery engine 606 for controlling the distribution of targeted information to devices in communication with the cloud-based server 600. The engine defines action(s) to be taken for a given context and generates targeted information to be presented to a user of a device (e.g., a user of the in-vehicle computing system). Actions may include gathering of data from multiple third party contents (e.g., via a content aggregator) and other sources of information (e.g., an in-vehicle computing system, a mobile device, a television, etc.) and mixing this data intelligently based on the user context. The cloud-based server 600 may include a service API manager 600 to manage the interfacing with devices/applications and associated service APIs (e.g., the in-vehicle computing system or other application in the cloud-based server) and provide the results of the actions.

The cloud-based server 600 may include a notification manager 610 to manage device (e.g., in-vehicle computing system, smart phone, television, etc.) identifiers for sending targeted information and/or other notifications/alerts. The notification manager 610 may interact with the delivery engine 606 to trigger targeted information delivery based on pre-configured relationships between contexts and actions. For example, in response to a detection that a user has selected a point of interest on a television and/or has started using an in-vehicle computing system, navigational data may be generated and sent to the in-vehicle computing system. Accordingly, the notification manager 610 may identify the device to which the information is to be sent (e.g., locate a device identifier for an in-vehicle computing system) and control the transmission of the information to that device.

One or more elements of the cloud-based server 600 may be periodically updated to expand functionality, address recurring issues (e.g., correct malfunctions), etc. A client API library update manager 612 may be responsible for informing a telematics server or other device/application (e.g., telematics server/content aggregator 604) about the availability of a new client API library for a specific vehicle make/model/year, device identifier, geography, etc. The telematics server or other device application may notify all vehicles (e.g., via the in-vehicle computing system) associated with the update that the update is available. Upon receiving the notification, the in-vehicle computing system of each vehicle may download the update using the client API download service via the telematics server. Although the client associated with the API library is described above as corresponding to the in-vehicle computing system, it is to be understood that the API library and associated updates may correspond to any suitable client, such as a mobile computing device (e.g., a smart phone associated with the driver or a passenger of the vehicle).

One or more user settings (e.g., associated with a driver or other user of a device), data delivery settings, etc., may be stored and/or accessed by a settings manager 614. The settings may be stored in a centralized database included in or otherwise in communication with the settings manager 614 so that all subsystems of the cloud-based server 600, as well as other devices in communication with the cloud-based server 600, may access the settings. For example, user settings may include user personalized data/settings, personal information, etc. stored as an ID-value pair. The user settings may be input by the user (e.g., via a graphical user interface and/or voice command interface of the in-vehicle computing system or other device executing a targeted data delivery application) or automatically imported from another user account (e.g., a social networking account for the user).

The cloud-based server 600 may include one or more subsystems, such as the data integration subsystem 616, the data persistence subsystem 618, and the analytics engine subsystem 620. The data integration subsystem 616 may be responsible for receiving and collating/gathering data from different systems (e.g., internal and/or external to the cloud-based server 600) and transforming the data to a format that is compatible with applications used by the cloud-based server. For example, for unstructured data 622 (e.g., data from social media services, click stream data, and/or other data that is received without structure defining the context or relationships between the data), the data integration subsystem 616 may search for relationships between the data elements and transform the data to a structured/semi-structured format (e.g., a format associated with structured data 624) for further processing. The data integration subsystem 616 may include and/or be connected to a communications interface of the cloud-based server 600 in order to communicate with the different systems. The data persistence subsystem 618 may be responsible for storage, retrieval, and management of data required by one or more applications running on the cloud-based server 600.

The analytics engine subsystem 620 may include standard machine learning libraries, which may be a combination of open source and proprietary/customized libraries that implement standard machine learning algorithms. For example, the machine learning libraries may support algorithms such as k-means clustering, mean shift clustering, singular value decomposition, user and item-based recommendation engines, etc. The analytics engine subsystem 620 may include application specific machine learning models that include a set of library functions that model data such as the behavior of a user/device/vehicle based on data received over a period of time. The application specific machine learning models support rules that incorporate user behavior, preferences, moods, etc.

The analytics engine subsystem 620 may include a natural language text processor that includes a set of library functions for analyzing text data of one or more languages. For example, the natural language text processor may include functions for sentence breaking, parse tree generation, part of speech tagging, topic segmentation, and/or other speech recognition techniques. The natural language text processor assists with building models for sentiment analysis and other language-based rules. The analytics engine subsystem 620 may include a $3^{rd}$ party machine learning (ML) model/service interface to provide an abstract interface to $3^{rd}$ party services that provide specialized models for a given machine learning problem. The $3^{rd}$ party ML model/service interface enables APIs for such $3^{rd}$ party models and services to be accessed and utilized by the cloud-based server 600 in order to increase the amount and types of processing provided by the cloud-based server 600. The results of the analysis performed by the analytics engine subsystem 620 may be stored at the data persistence subsystem 618 and accessed by the data delivery engine 606, the service API manager 608, the notification manager 610, and/or any other subsystem of the cloud-based server 600 or external server (e.g., via a communications interface of the cloud-based server 600). For example, in embodiments where targeted information is provided to one or more user devices by a third party rather than the cloud-based server 600, the information received from the devices and/or contextual information determined from aggregated information may be transmitted to the third party.

Figure 7:
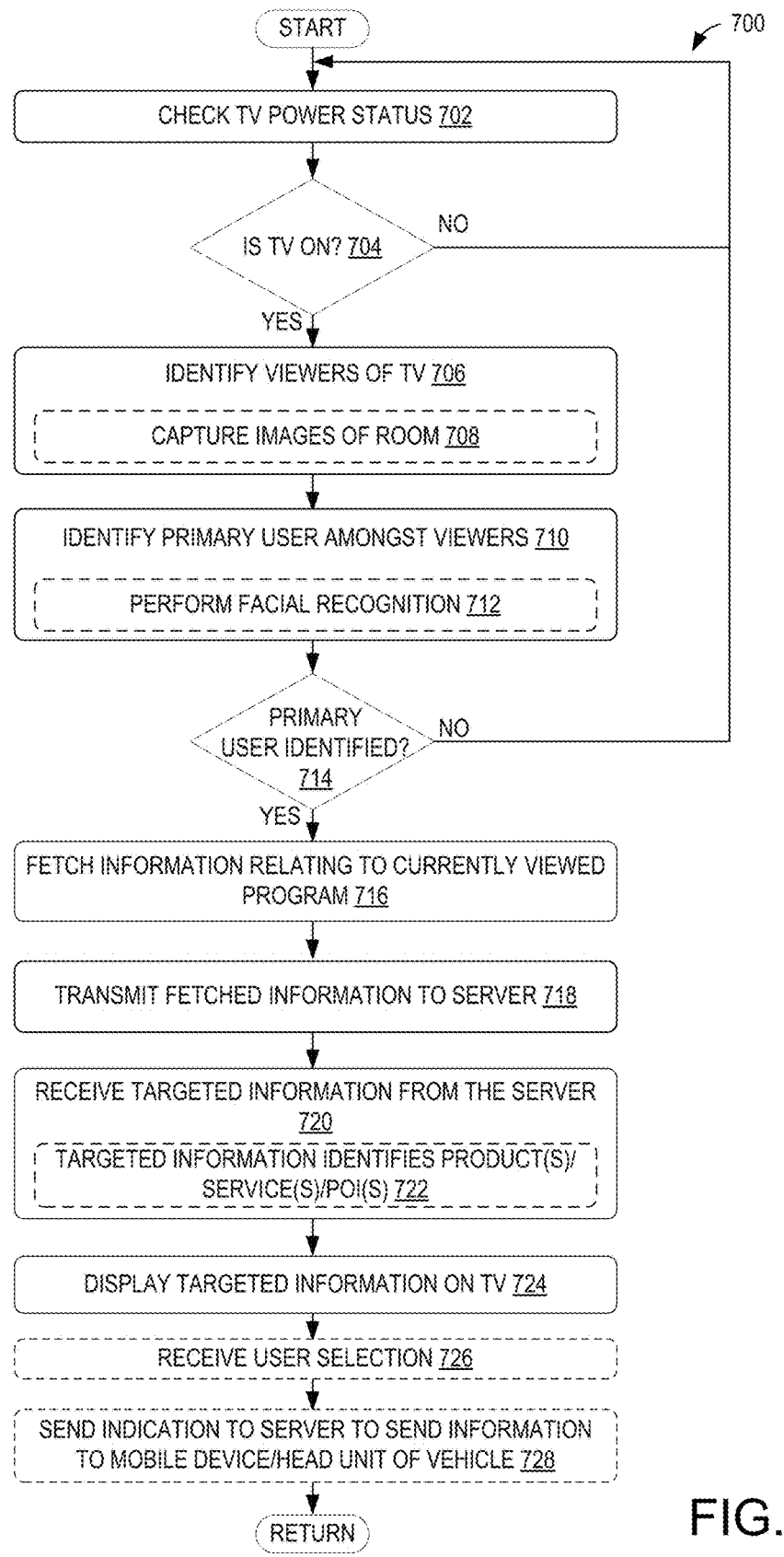
FIG. 7 is a flow chart of a method for presenting targeted information at a plurality of devices in accordance with one or more embodiments of the present disclosure.
Figure 8:
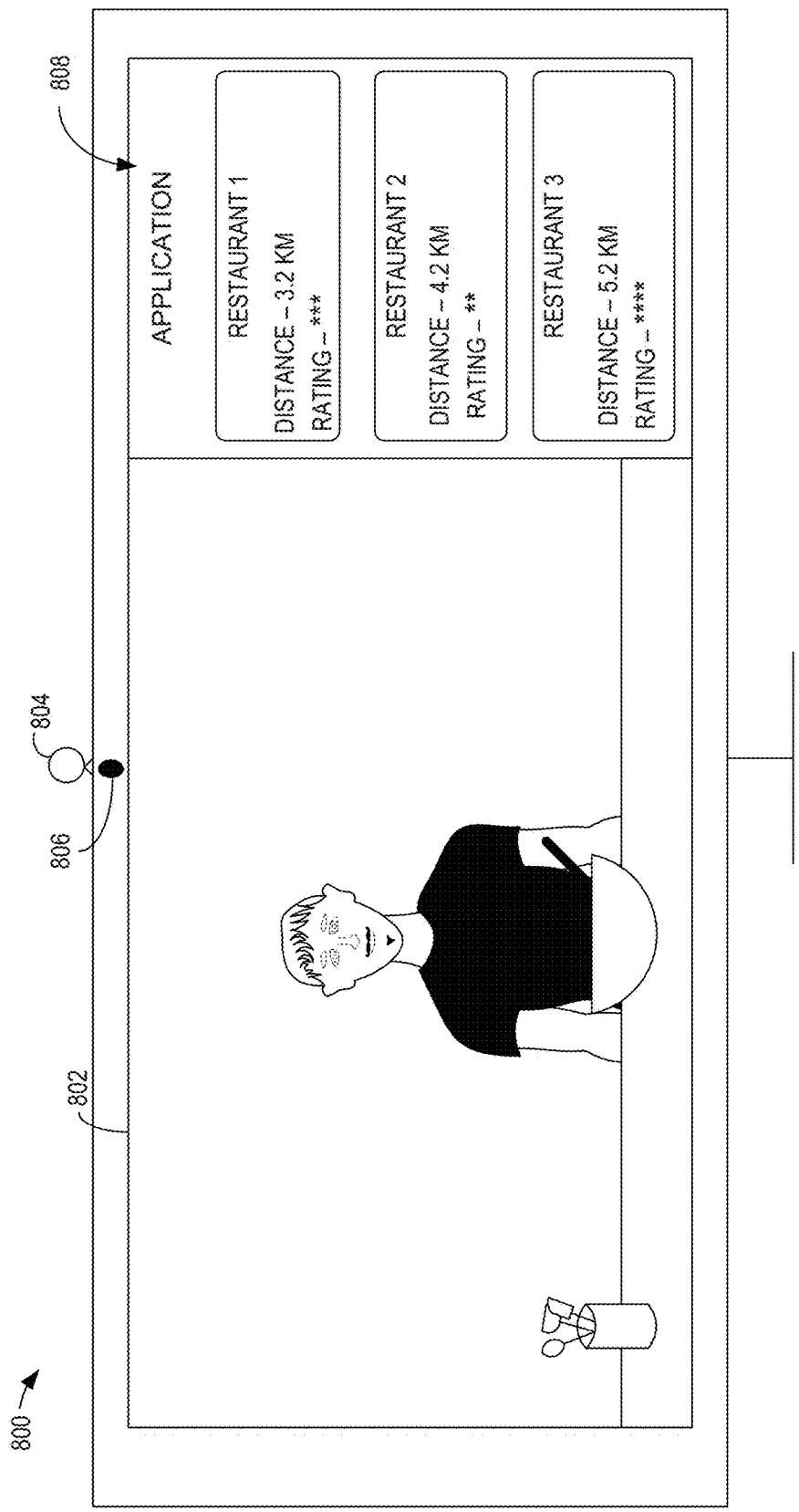
FIG. 8 shows an example user interface for a targeted information application in a television in accordance with one or more embodiments of the present disclosure.

FIG. 7 is a flow chart of an example method 700 for presenting targeted information at a plurality of devices based on a user context. At 702, the method 700 includes checking a television power status. At 704, the method includes determining whether the television is powered on. If the television is not powered on (e.g., "NO" at 704), the method 700 returns to continue checking the power status of the television. If the television is powered on (e.g., "YES" at 704), the method 700 proceeds to 706 to identify viewers of the television. For example, the method 700 may include capturing one or more images of a room in which the television is located, as indicated at 708. Turning briefly to FIG. 8, an example television 800 is illustrated, including a display 802 for presenting content to a user. The television 800 may include and/or be communicatively connected to a camera 804 for imaging an environment and/or viewers within the environment of the television 800. The television 800 may also include and/or be communicatively connected to a microphone 806 for capturing ambient/environmental noise and/or for receiving audio inputs (e.g., voice commands) from users.

Returning to FIG. 7, viewers may be identified by analyzing the data from the images (e.g., locally at the television and/or remotely at a cloud-based server) to determine a number and/or identity of users in the room. At 710, the method 700 includes identifying a primary user amongst the viewers. For example, the primary user may be identified by performing facial recognition, as indicated at 712. While identifying viewers of the television may include performing a crude recognition of users within images captured by a camera (e.g., using object identification to differentiate people from other objects in the room), identifying the primary user may include performing facial recognition on each viewer to determine identities associated with each viewer. A primary user may be recognized as a user providing input to the television (e.g., identifying that a particular viewer is holding a remote control and/or providing voice/touch inputs to the television) in some embodiments. It is to be understood that the viewers and the primary user may be identified in any suitable manner.

At 714, the method 700 includes determining if the primary user is identified. If the primary user is not identified (e.g., "NO" at 714), the method returns to 702 continue monitoring the television and viewers of the television. If the primary user is identified (e.g., "YES" at 714), the method 700 proceeds to 716 to fetch information relating to a currently viewed program. Returning briefly to FIG. 8, the content displayed by the television may include a cooking program that is being currently viewed. Turning back to FIG. 7, the method 700 includes transmitting the fetched information to a server, as indicated at 718. For example, fetched information may be transmitted to a cloud-based server, such as cloud-based server 200 of FIG. 2, via a communication link of the television. At 720, the method includes receiving targeted information from the server. The targeted information may identify one or more products, services, points of interest, and/or other information related to the currently-viewed program, as indicated at 722. The method 700 includes displaying the targeted information on the television, as indicated at 724.

Although method 700 includes sending information to a mobile device and/or a head unit of a vehicle based on user selection received at a television, it is to be understood that targeted information may be coordinated for display on any suitable number of devices. For example, after viewing the targeted information on the television, the user may select a particular restaurant and indicate an interest to order take out from the selected restaurant. In response, the server may retrieve a telephone number for the restaurant and pass the telephone number to a mobile phone of the user. The user may utilize the mobile phone to call the restaurant and place an order. Upon determining that an order was placed (e.g., based upon completion/duration of the phone call, voice data captured during the call and/or other information received at the mobile phone, television, and/or other suitable devices), the server may fetch an address of the restaurant and pass the address to an in-vehicle computing system of a vehicle associated with the user. Accordingly, upon entering the vehicle, a navigation application of the in-vehicle computing system may generate and display a route to the address of the restaurant. In this way, user input may be received at one or more devices to control the information that is sent to one or more other devices in anticipation of the user using the other devices.

For example, as shown in FIG. 8, a user interface 808 for a targeted information application may be displayed alongside the currently viewed program. In the example illustrated in FIG. 8, the targeted information presented by the user interface 808 may include restaurant recommendations. The restaurant recommendations may be selected based upon the information regarding the currently viewed program (as fetched by the television and communicated to the cloud-based server), as well as user information (e.g., historical data, user preferences, user location, time of day, etc.). For example, the selected restaurant recommendations may serve a style of food shown in the cooking program currently viewed by the user and may be recommended by friends of the user on social networking profiles associated with the user. Accordingly, the recommendations may be generated by the cloud-based server based upon information from the television indicating a current context of the user, as well as information from other devices/historical data relevant to the user. As illustrated, the targeted information may be presented simultaneously with the currently viewed program, and the size, location, timing, and appearance of the recommendations may be based on user-specified settings. For example, the targeted information may be configured to be shown as an overlay to a currently viewed program that at least partially obscures the program in some embodiments. In other embodiments, the display of the currently viewed program may be resized/formatted to accommodate display of the targeted information on some position of the display relative to the display of the currently viewed program.

Returning to FIG. 7, the method 700 may include receiving a user selection directed toward the targeted information, as indicated at 726. For example, the user may select a recommended restaurant amongst a list of recommended restaurants (e.g., via a remote controller, voice input, touch input, etc.). The method 700 may include sending an indication to the server to send information to a mobile device and/or head unit (e.g., of an in-vehicle computing system) of a vehicle, as indicated at 728. For example, responsive to selecting a particular recommended restaurant, an address of the selected restaurant may be sent to one or more in-vehicle computing systems associated with the primary user, such that the in-vehicle computing system may automatically display the targeted information and/or provide navigation to the address associated with the selected restaurant.

Figure 9:
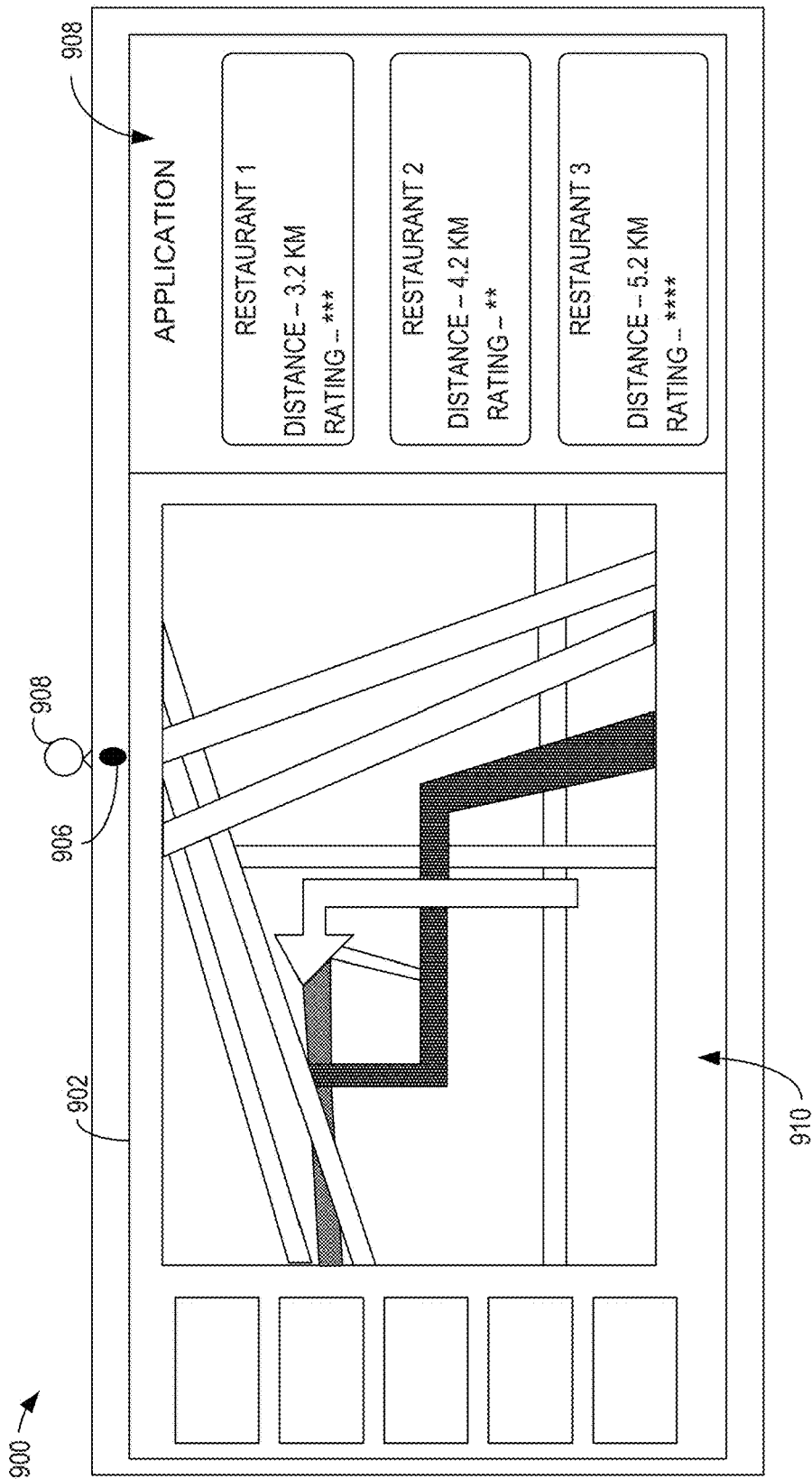
FIG. 9 shows an example user interface for a targeted information application in an in-vehicle computing system in accordance with one or more embodiments of the present disclosure.

Turning to FIG. 9, an example in-vehicle computing system 900 is illustrated. For example, in-vehicle computing system 900 may be an example of in-vehicle computing system 109 of FIG. 1 and/or in-vehicle computing system 202 of FIG. 2. Similarly to the television 800 of FIG. 8, the in-vehicle computing system 900 may include a display 902, a camera 904, and/or a microphone 906. As illustrated, user interface 908 for a targeted information application may display the same information (e.g., the list of restaurants) as user interface 808 of FIG. 8 in order to provide a unified user experience between the devices. It is to be understood that the user interface 808 may additionally or alternatively display different information in some embodiments and/or be continually updated as the context of the user changes. The in-vehicle computing system 900 may also display navigational directions to a selected restaurant in a main application region 910 responsive to the selection of the targeted information at the television at 726 of method 700 (as shown in FIG. 7).

While an example scenario of a primary user interaction with a television providing targeted information that may be passed to an in-vehicle computing system is described above, it is to be understood that any suitable combination of devices may be utilized to deliver any suitable type of targeted information amongst the devices. For example, based on information from an in-vehicle computing system indicating that vehicle servicing is requested (e.g., due to a date/time matching a regularly scheduled servicing appointment and/or due to a detected vehicle state indicating a malfunction or alert), targeted information related to the vehicle servicing may be passed to one or more devices associated with the primary user (or all users) of the vehicle/in-vehicle computing system. For example, information related to nearby service stations may be presented at a device currently being used by the primary user in order to alert the user to the requested servicing. User interest in ads displayed on multiple devices (e.g., a television, mobile device, etc.) may be leveraged to recommend products associated with the ads on a currently-used device. The recommended products may be selected to match demographic information (e.g., marital status, financial status/earning capabilities, etc.) and user preferences/lifestyle estimations (e.g., favorite color, frequent destinations/transportation preferences, etc.) determined from information received at a cloud-based server from multiple devices. For example, products, services, and/or points of interest may be determined based on a context of the user and filtered based on the user demographics, preferences, and/or lifestyle estimations.

By leveraging real-time contextual data from multiple user devices and historical data, a cloud-based server may send targeted information to selected devices as a user transitions between the devices to provide a unified user experience that adapts to dynamic behavior, environmental, and operational changes. Adjusting device behavior and information output responsive to a context of the user of the device that is derived from a plurality of information sources enables the device to provide more autonomous and accurate operation than devices that rely primarily on user input and a more limited amount of data gathering.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or cloud-based server(s) 200 described with reference to FIGS. 1 and 3. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system, comprising:
a processor;
an external device interface communicatively coupleable to an extra-vehicle server; and
a storage device storing instructions executable by the processor to:
send user information to the extra-vehicle server, the user information including information identifying a user of the in-vehicle computing system;
in response to a user input at a device other than the extra-vehicle server indicating an interest in a product or service displayed on the device by selecting a recommendation displayed on the device that is received from the extra-vehicle server based on a current viewed program displayed on the device and based on user information including a social networking profile associated with the user, receive targeted information associated with the selected recommendation from the extra-vehicle server including navigational data for a navigation application of the in-vehicle computing system, the targeted information based on contextual information determined from interaction of the user with the device to select the recommendation, the device being a television configured to communicate data to the in-vehicle computing system through the extra-vehicle server; and
present navigation information at the in-vehicle computing system based on an input of the navigational data to the navigation application, the navigational data input to the navigation application being based on the product or service displayed on the television.

2. The in-vehicle computing system of claim 1, wherein the contextual information is location-specific regarding a navigation destination and a current activity of the user, wherein the user is a primary user of the in-vehicle computing system, and wherein a contextual trigger comprises the primary user interacting with the in-vehicle computing system.

3. The in-vehicle computing system of claim 1, wherein presenting the targeted information includes presenting the targeted information while displaying an application of the in-vehicle computing system that has system-wide focus, wherein the targeted information includes a list of recommendations based on a currently-viewed program displayed on the television and recommendations of friends of the user on the social networking profile of the user, and wherein a contextual trigger comprises the user making a selection on the television based on content that is displayed on the television.

4. The in-vehicle computing system of claim 1, wherein the user information is generated at the in-vehicle computing system via user input and wherein the television is connected to the in-vehicle computing system through the extra-vehicle server.

5. The in-vehicle computing system of claim 1, wherein the user information is retrieved at the in-vehicle computing system from the storage device, wherein additional targeted information is transmitted to a mobile device responsive to the user input at the television, the additional targeted information including a telephone number that is based on the product or service displayed on the television when the user input is provided to the television, and wherein the targeted information is transmitted to the in-vehicle computing system responsive to determining that a call to the telephone number was completed at the mobile device.

6. The in-vehicle computing system of claim 1, wherein the user information is determined at the in-vehicle computing system based on captured data from one or more sensors of the in-vehicle computing system, the user information including an identity of the user determined via one or more of facial recognition and voice recognition performed on the captured data.

7. The in-vehicle computing system of claim 1, wherein the instructions are further executable to send vehicle status information to the extra-vehicle server, and wherein the targeted information is received without input from the user at the in-vehicle computing system.

8. The in-vehicle computing system of claim 1, wherein the targeted information is presented at the in-vehicle computing system responsive to receiving the targeted information and the targeted information is received at the in-vehicle computing system without user input requesting the targeted information.

9. A system for delivering targeted data to user devices, the system comprising:
   one or more processors;
   a data integration subsystem comprising first instructions stored in computer-readable memory and executable by the one or more processors to receive data from an in-vehicle computing system and at least one other user device regarding interactions of multiple users with the in-vehicle computing system and the at least one other user device, the at least one other user device being connected to the in-vehicle computing system via the system for delivering targeted data;
   an analytics engine comprising second instructions executable by the one or more processors to analyze the received data from the multiple users of the in-vehicle computing system and the at least one other user device; and
   a data delivery engine comprising third instructions executable by the one or more processors to generate and send targeted information to a targeted device and without user input on the targeted device, the targeted device including one or more of the in-vehicle computing system, the at least one other user device, and another device, the targeted information being sent to the targeted device based on results from the analytics engine responsive to detecting that a user of the at least one other user device is indicating an interest in a product or service displayed on a selected device other than the targeted device through interaction with the selected device to select a recommendation displayed on the selected device that is received from the extra-vehicle server based on a current viewed program displayed on the selected device, at least a portion of the targeted information being presented with a same appearance in a same relative position at each of the selected device and the targeted device to provide a unified user experience between the selected device and the targeted device, the targeted information being associated with the selected recommendation.

10. The system of claim 9, wherein the analytics engine analyzes the received data based on historical data for one or more of the user and the user device to determine a behavior of the user, wherein the targeted device is the in-vehicle computing system, and wherein the targeted information includes navigational information based on user interaction with the at least one other user device.

11. The system of claim 9, wherein the at least one other device includes one or more of a television, an audio/video receiver, and a mobile device and wherein the data from the at least one other user device includes an identifier of content presented by the at least one other user device, and wherein generating and sending the targeted information to the targeted device is performed in response to a user input on a device other than the targeted device.

12. The system of claim 11, wherein the data delivery engine sends the targeted information to the at least one other user device before detecting that the user of the at least one other user device is interacting with the in-vehicle computing system.

13. The system of claim 11, wherein the data delivery engine generates a list of one or more of recommended products, services, and points of interest related to the content and sends the list to the at least one other user device, the list being displayed on both the selected device and the targeted device.

14. The system of claim 13, wherein the targeted information includes navigational data associated with a selected item of the list of one or more of recommended products, services, and points of interest, the selected item being selected via a user interface of the at least one other user device.

15. The system of claim 9, wherein the data delivery engine sends the results from the analytics engine to a third party device, the third party device being different from the in-vehicle computing system and the at least one other device, wherein the targeted device is a mobile device, wherein the targeted information includes one or more products or services based on the results from the analytics engine, and wherein the targeted information is presented in a first user interface alongside a first main application region for the targeted device and in a second user interface along a second main application region for the selected device.

16. A method for delivering targeted information to one or more user devices, the method comprising:
   receiving user information, the user information including information identifying a primary user of an in-vehicle computing system;
   aggregating, at an extra-vehicle server, the user information with information from two or more other devices associated with the primary user and connected to the extra-vehicle server to determine contextual information for the primary user, the two or more other devices including a television and a second device;
   generating targeted information based on the contextual information; and
   in response to an input at the television indicating an interest in a product or service displayed on the television simultaneously to a currently-viewed television program being presented on the television by selecting a recommendation displayed on the television that is received from the extra-vehicle server based on the currently-viewed television program being presented on the television, sending, via the extra-vehicle server, the targeted information associated with the selected recommendation to a selected device of the in-vehicle computing system and the second device, the targeted information including a type of data that is selected based on the selected device, where the targeted information for the in-vehicle computing system includes different data relevant to the contextual information than the targeted information for the second device, the targeted information for the in-vehicle computing system including navigational data controlling a navigation application of the in-vehicle computing system based on the product or service displayed on the television.

17. The method of claim 16, further comprising receiving an indication of the primary user using the selected device and sending the targeted information to the selected device responsive to receiving the indication, and wherein the selected device is a mobile device, and the targeted information includes contact information.

18. The method of claim 16, wherein aggregating the user information with the information from the two or more other devices includes aggregating the user information with one or more of user preferences and information from social network profiles associated with the primary user, and wherein the targeted information is sent to the selected device without a user input at the second device.

19. The method of claim 16, wherein the second device includes a mobile phone, and wherein sending the targeted information to the mobile phone includes sending contact information relevant to the contextual information, and wherein the contextual information is based on content that is displayed on the television.

20. The method of claim 16, wherein aggregating the user information with the information from the two or more other devices includes estimating one or more parameters of a user lifestyle and wherein generating the targeted information includes determining one or more of products, services, and points of interest relevant to the contextual information and filtering the determined one or more of products, services, and points of interest based on the estimated user lifestyle.

* * * * *